(12) United States Patent
Selker et al.

(10) Patent No.: US 11,449,140 B2
(45) Date of Patent: Sep. 20, 2022

(54) MULTIMODAL EYE TRACKING

(71) Applicant: Magic Leap, Inc., Plantation, FL (US)

(72) Inventors: Edwin Joseph Selker, Palo Alto, CA (US); Ivan Yeoh, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/678,314

(22) Filed: Feb. 23, 2022

(65) Prior Publication Data

US 2022/0179488 A1 Jun. 9, 2022

Related U.S. Application Data

(63) Continuation of application No. 17/239,451, filed on Apr. 23, 2021, now Pat. No. 11,294,462, which is a continuation of application No. 15/953,432, filed on Apr. 14, 2018, now Pat. No. 11,016,561.

(60) Provisional application No. 62/485,820, filed on Apr. 14, 2017.

(51) Int. Cl.
*G06F 3/01* (2006.01)
*G06T 19/00* (2011.01)
*G06F 3/0346* (2013.01)
*G02B 27/01* (2006.01)

(52) U.S. Cl.
CPC ........... *G06F 3/013* (2013.01); *G02B 27/017* (2013.01); *G06F 3/011* (2013.01); *G06F 3/0346* (2013.01); *G06T 19/006* (2013.01)

(58) Field of Classification Search
CPC ........ G06F 3/013; G06F 3/0346; G06F 3/011; G02B 27/017; G02B 2027/014; G02B 2027/0187; G06T 19/006
See application file for complete search history.

(56) References Cited

U.S. PATENT DOCUMENTS

| 7,758,185 | B2 | 7/2010 | Lewis |
| 8,353,594 | B2 | 1/2013 | Lewis |
| 8,696,113 | B2 | 4/2014 | Lewis |
| 8,733,927 | B1 | 5/2014 | Lewis |

(Continued)

FOREIGN PATENT DOCUMENTS

| WO | 2014084224 A1 | 6/2014 |
| WO | 2018191731 A1 | 10/2018 |

OTHER PUBLICATIONS

European Office action dated Jun. 30, 2021, for EP Application No. 187842034, either pages.

(Continued)

*Primary Examiner* — Andrew Sasinowski
(74) *Attorney, Agent, or Firm* — Morrison & Foerster LLP

(57) ABSTRACT

A method is disclosed, the method comprising the steps of receiving, at a first time interval from a first sensor configured to output data indicative of a first position of an eye, first data; receiving, at a second time interval from a second sensor configured to output data indicative of a delta position of the eye, second data; determining, based on the first data, a first position of the eye; determining, based on the second data, a delta position of the eye; determining, using the first position of the eye and the delta position of the eye, a second absolute position of the eye; and in response to determining the second position of the eye, generating an output signal indicative of the second position of the eye.

19 Claims, 6 Drawing Sheets

(56) References Cited

U.S. PATENT DOCUMENTS

| | | | |
|---|---|---|---|
| 8,733,928 B1 | 5/2014 | Lewis | |
| 8,878,749 B1 | 11/2014 | Wu | |
| 9,010,929 B2 | 4/2015 | Lewis | |
| 9,235,064 B2 | 1/2016 | Lewis | |
| 9,239,473 B2 | 1/2016 | Lewis | |
| 9,244,293 B2 | 1/2016 | Lewis | |
| 9,658,473 B2 | 5/2017 | Lewis | |
| 10,151,937 B2 | 12/2018 | Lewis | |
| 10,185,147 B2 | 1/2019 | Lewis | |
| 11,016,561 B2 | 5/2021 | Selker et al. | |
| 11,294,462 B2 | 4/2022 | Selker | |
| 2008/0204658 A1 | 8/2008 | Van Saarloos | |
| 2015/0126845 A1 | 5/2015 | Jin et al. | |
| 2015/0309568 A1 | 10/2015 | Miki | |
| 2015/0338915 A1 | 11/2015 | Publicover | |
| 2016/0063767 A1 | 3/2016 | Lee et al. | |
| 2016/0270656 A1 | 9/2016 | Samec et al. | |
| 2016/0341959 A1* | 11/2016 | Gibbs | G06V 20/20 |
| 2016/0364881 A1 | 12/2016 | Mallinson et al. | |
| 2017/0323485 A1* | 11/2017 | Samec | A61B 5/7275 |
| 2018/0137678 A1* | 5/2018 | Kaehler | G02B 27/017 |
| 2018/0341328 A1* | 11/2018 | Agell | A61B 5/398 |
| 2019/0320891 A1* | 10/2019 | Meroni | G06F 3/011 |
| 2020/0234813 A1* | 7/2020 | Orr | G16H 50/30 |
| 2021/0104100 A1* | 4/2021 | Whitney | G02B 27/0172 |
| 2021/0333872 A1 | 10/2021 | Selker et al. | |

OTHER PUBLICATIONS

Extended European Search Report dated Mar. 25, 2020, for EP Application No. 18784203.4, nine pages.

Final Office Action dated May 19, 2020, for U.S. Appl. No. 15/953,432, filed Apr. 14, 2018, nine pages.

Indian Office Action dated Feb. 10, 2022, for IN Application No. 201947041613, with English translation, 6 pages.

International Search Report dated Aug. 29, 2018, for PCT Application No. PCT/US18/27679, filed Apr. 13, 2018, five pages.

Jacob, Robert J.K. (1995). "Eye Tracking in Advanced interface Design," Human-Computer Interaction Lab, Naval Research Laboratory, Washington, D.C., 50 pages.

Non-Final Office Action dated Dec. 9, 2019, for U.S. Appl. No. 15/953,432, filed Apr. 14, 2018, nine pages.

Non-Final Office Action dated Oct. 1, 2021, for U.S. Appl. No. 17/239,451, filed Apr. 23, 2021, ten pages.

Notice of Allowance dated Jan. 21, 2022, for U.S. Appl. No. 17/239,451, filed Apr. 23, 2021, seven pages.

Notice of Allowance dated Oct. 9, 2020, for U.S. Appl. No. 15/953,432, filed Apr. 14, 2018, 14 pages.

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Australian Office Action dated Mar. 3, 2022, for AU Application No. 2018252665, four pages.

Israeli Office Action dated Feb. 18, 2022, for IL Application No. 269861, four pages.

Japanese Office Action dated Apr. 25, 2022, for JP Application No. 2019-555584, with English translation, 9 pages.

* cited by examiner

MULTIMODAL EYE TRACKING

CROSS REFERENCE TO RELATED APPLICATION

This application is a continuation of U.S. application Ser. No. 17/239,451, filed on Apr. 23, 2021, which is a continuation of U.S. application Ser. No. 15/953,432, filed on Apr. 14, 2018 (Now U.S. Pat. No. 11,016,561, issued May 25, 2021), which claims the benefit under 35 U.S.C. § 119(e) of U.S. Patent Application No. 62/485,820, filed Apr. 14, 2017, the contents of which are incorporated herein by reference in their entirety for all purposes.

FIELD

Examples of the disclosure relate to systems and methods for tracking a human eye, and more specifically, for determining and/or characterizing a position, movement, and/or behavior of a human eye.

BACKGROUND

Generally speaking, eye tracking systems generate one or more signals corresponding to a position and/or movement of a user's eye. (Throughout the disclosure, "position" should be understood to include a position and/or an orientation, and "movement" should be understood to include a movement and/or a rotation, of an eye.) These signals may be used as input to various computer systems, and find use in applications as diverse as gaming, navigation, sports training, communications, and medical research; or in other situations in which it is beneficial to know where a user is looking. In particular, eye tracking systems may find use in 3D virtual environments, such as employed by some "augmented reality" (AR) systems, where knowledge of a user's eye movements can enhance a feeling of immersion in the virtual environment. In some examples, eye tracking systems involve a mobile apparatus, such as a head-mounted device with sensors oriented toward the wearer's eye.

It is desirable for eye tracking systems to accurately reflect eye positions and movements, even under dynamic or unpredictable conditions (such as varying weather and lighting conditions). Further, as with most computer systems, it is desirable to reduce the power consumed by eye tracking systems, for example to preserve battery life in mobile systems. These goals are not always compatible: for example, high resolution optical scanning may generate accurate eye tracking results, but at the expense of high power consumption. Updating sensor data at a low refresh rate may conserve power, but fail to accurately capture high frequency eye movements. The disclosure is directed to multimodal systems and methods for combining sensors, such as optical sensors and electro-ocular voltage sensors, to enhance the accuracy and/or power consumption of eye tracking systems. The disclosure is further directed to systems and methods for using such sensors to characterize the behavior of an eye, which information may be used to further enhance eye tracking accuracy and/or power consumption.

BRIEF SUMMARY

Examples of the disclosure describe systems and methods for tracking a human eye. According to examples of the disclosure, sensors such as optical sensors and electro-ocular voltage sensors can be combined to enhance eye tracking, such as by improving accuracy and power consumption. For example, first data indicative of a first position (e.g., an absolute position) of the eye may be received at a first time interval from a first sensor. Second data indicative of a delta position of the eye may be received at a second time interval from a second sensor. A second position (e.g., an absolute position) of the eye may be determined using the first position and the delta position. The sensors can be further used (for example, with machine learning techniques) to characterize various behaviors of the eye, which information can be used to further enhance eye tracking.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Eye tracking systems must contend with the challenge of reliably deriving accurate data from one of our most skittish and mercurial body parts. Further, such systems may be tasked with doing so unobtrusively; in unpredictable lighting conditions; in awkward physical environments, and with a minimum of power consumption. Examples of the disclosure are directed to multimodal systems and methods for combining sensors, such as optical sensors and electro-ocular voltage sensors, to address these challenges, as described below.

Ophthalmology

Figure 1:
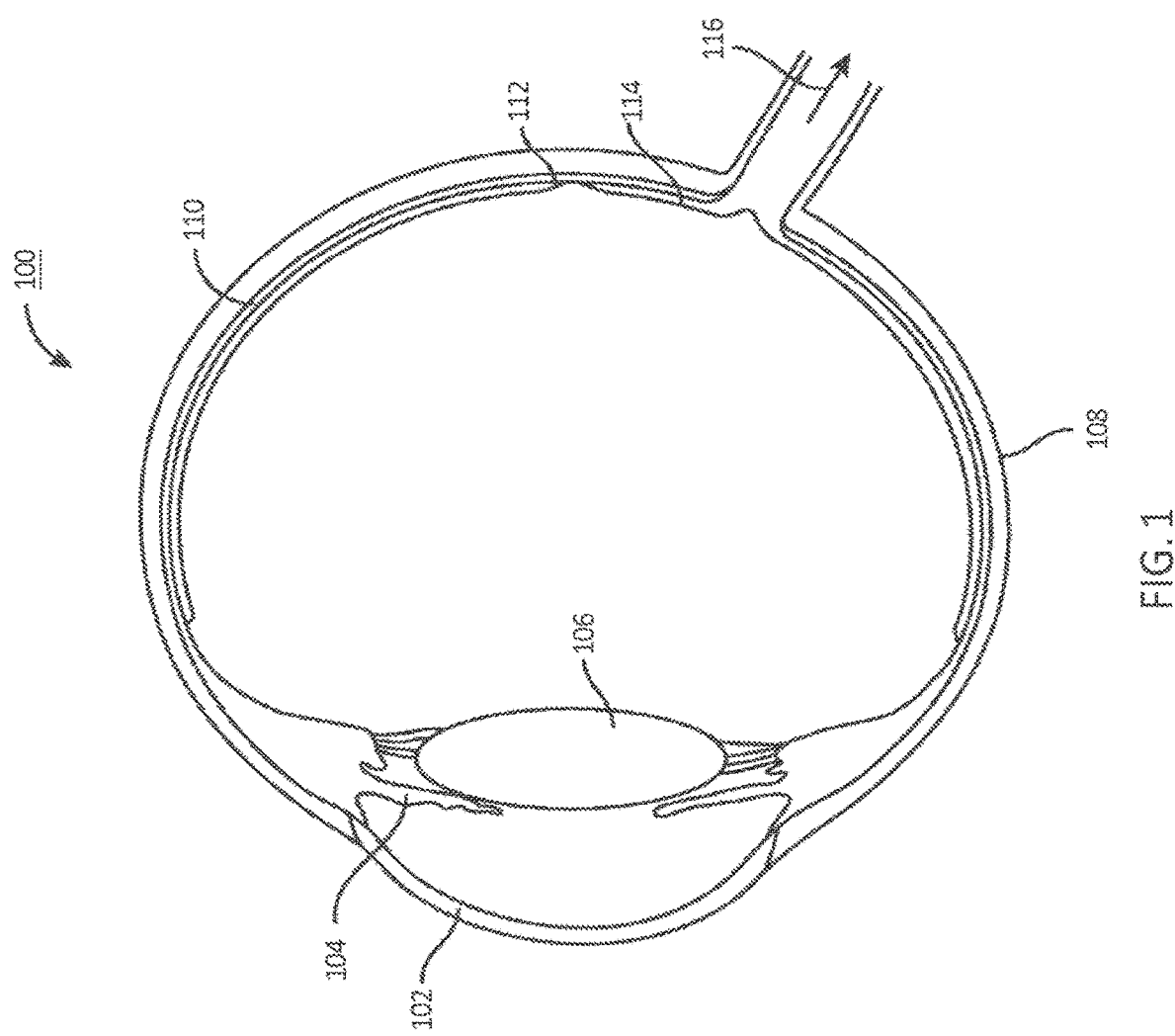
FIG. 1 illustrates a cross-section of a human eye.

FIG. 1 is a cross-sectional view of a human eye (100) and is depicted to include a cornea (102), iris (104), lens (106), sclera (108), choroid layer (110), macula (112), retina (114), and optic nerve (116) to the brain. Light enters the front of the eye (100) at the cornea (102). The iris (104) regulates the amount of light that is admitted on the retina (114), and the lens (106) may accommodate and focus an image at the retina (114). In turn, the retina (114) transforms the visual stimuli to electrical signals (e.g., receptor potentials) that are transmitted to the visual cortex via the optic nerve (116). The macula (112) is the center of the retina (114), which is utilized to see moderate detail. At the center of the macula (112) is the relatively small fovea, which is utilized to see fine detail, and which contains more photoreceptors (approximately 120 cones per visual degree) than any other portion of the retina (114). The eye (100) may be rotated by two pairs of direct muscles and a pair of oblique muscles (not shown) to provide six degrees of freedom. The optic nerve (116) is surrounded by the muscles of the eye.

The human visual system is configured to actively scan the environment via the activity of muscles coupled to the eyes, which include photoreceptors that generate neurological signals in response to light incident on the retina. The eyes are capable of making many different movements using these muscles. These at least include small movements (e.g., tremor), faster tracking movements (e.g., smooth pursuit), and very fast movements (e.g., saccadic, ballistic). Some movements may be autonomic and mostly involuntary, while others may be voluntary. As discussed herein, eye movements may refer at least to rotation of an eye about a horizontal axis, an (initially) vertical axis which rotates with the globe about the horizontal, and a torsion axis along the angle of gaze.

Some eye movements may be described as saccadic eye movement. Saccades are rapid, conjugate ballistic movements of the eye that abruptly change a point of fixation. Saccades may involve movements of the eye at speeds up to 900 degrees per second. Generally, saccadic eye movements bring objects of interest into the field of view. For example, when reading a book, the eyes will make jerky saccadic movement and stop several times, moving very quickly between each point of fixation. In another example, a vehicle driver will make saccadic eye movements to look at other cars on the road, traffic signs, car interior, and so forth. Moving the eyes quickly allows different portions of an object to be imaged by the fovea. Saccadic eye movements may be voluntary, executed as a reflex in response to visual stimulus, and/or corrective, such as in response to optokinetic or vestibular movement. For instance, a reflexive saccade may be triggered by an external stimulus or by the disappearance of a fixation stimulation. An antisaccade may voluntarily move the eyes away from a visual stimulus. A scanning saccade may be voluntary and allow examination of a different portion of the visual environment. A memory saccade may move the eyes toward a remembered point. A predictive saccade may anticipate movement of an object of interest. Saccades may also occur during a rapid eye movement phase of sleep.

Some eye movements may be described as smooth pursuit movements, which are conjugate eye movements that slowly track moving visual objects of interest in the range of about 1 degree per second to about 100 degrees per second, to keep the image of the object stable on the retina. Smooth pursuit movements are not generally under voluntary control.

Some eye movements may be described as fixation, which is a stationary state of the eyes in which the eye holds an image of an object of interest on the retina. Fixation may last between about 100 ms and about 1000 ms.

Some eye movements may be described as nystagmus. Nystagmus is a form of involuntary eye movement that includes alternating between a slow phase and fast phase. Nystagmus eye movements may be described as optokinetic or vestibular. Optokinetic nystagmus refers to a stationary visual receptor and rapidly moving object of interest. Optokinetic nystagmus may have a characteristic sawtooth pattern of eye motion; it includes a slow phase in which the eye fixates on a portion of the moving field is followed by pursuit motion, and a fast phase (i.e., return saccadic jump) in which the eye fixates on a new portion of the field. Vestibular nystagmus may occur in response to motion of the head to stimulate the semicircular canals of the inner ear. Sensory information from the semicircular canals may direct the eyes to move in a direction opposite to the head movement, thus approximately maintaining the image of the object of interest on the retina.

Some eye movements may be described as vestibulo-ocular. Vestibulo-ocular movement refers to movement of the head and/or body (e.g., the neck) in conjunction with movement of the eye. Vestibulo-ocular movement may relieve strain on the eyes by allowing the larger muscles of the head and neck to aid with large-scale or rapid movements—for instance, when viewing objects in the periphery of one's vision, or when tracking objects that rapidly move across one's field of vision. For example, most people prefer to move their heads when their eye gaze needs to move more than about 20 degrees off center to focus on a particular object of interest. Head movement also allows the human visual system to benefit from depth cues from head motion parallax, which can help identify the relative depth of objects in one's field of view. Head and eye motion are coordinated using the vestibulo-ocular reflex, which stabilizes image information relative to the retina during head rotations.

The eyes may engage in combinations of various types of eye movement, such as the types of eye movement described above. For the purposes of the below disclosure, an eye behavior is one or more eye movements (or a pattern of one or more eye movements), and may include head movements, such as in the case of vestibulo-ocular movement. Which eye behaviors a person's eye engages in are influenced by several external factors: for example, the activity the person is engaged in (e.g., reading, driving); the person's location and surroundings (e.g., in a quiet library, in heavy vehicular traffic); and environmental factors (e.g., ambient lighting conditions, temperature). Knowledge of these external factors may help predict the human's eye behaviors. For example, knowledge that a person is reading a book may suggest that the person's eyes are engaged in saccadic movement. Conversely, knowledge of a person's eye behaviors may suggest various external factors. For example, knowledge that a person's eyes are engaged in saccadic movement may suggest that the person is reading a book.

Eye Tracking

Several technologies exist for obtaining measurements relating to a position of a user's eye.

Some such technologies include optical sensors, such as cameras. For instance, light may be reflected from the eye and sensed by an optical sensor to detect eye position and movement. Other such technologies may involve measuring the electrical potential that may exist between two locations of the human eye. For example, with reference to FIG. 1, the cornea (102) of the eye (100) is electrically positive relative to the retina (114), and forms a steady electric potential field that may be described as a fixed dipole with a positive pole at the cornea (102) and a negative pole at the retina (114). As the eye rotates, the electrostatic dipole rotates with it. This corneo-retinal potential typically has a range of 0.4 mV to 1.0 mV, and is independent of light stimulation.

Figure 2A:
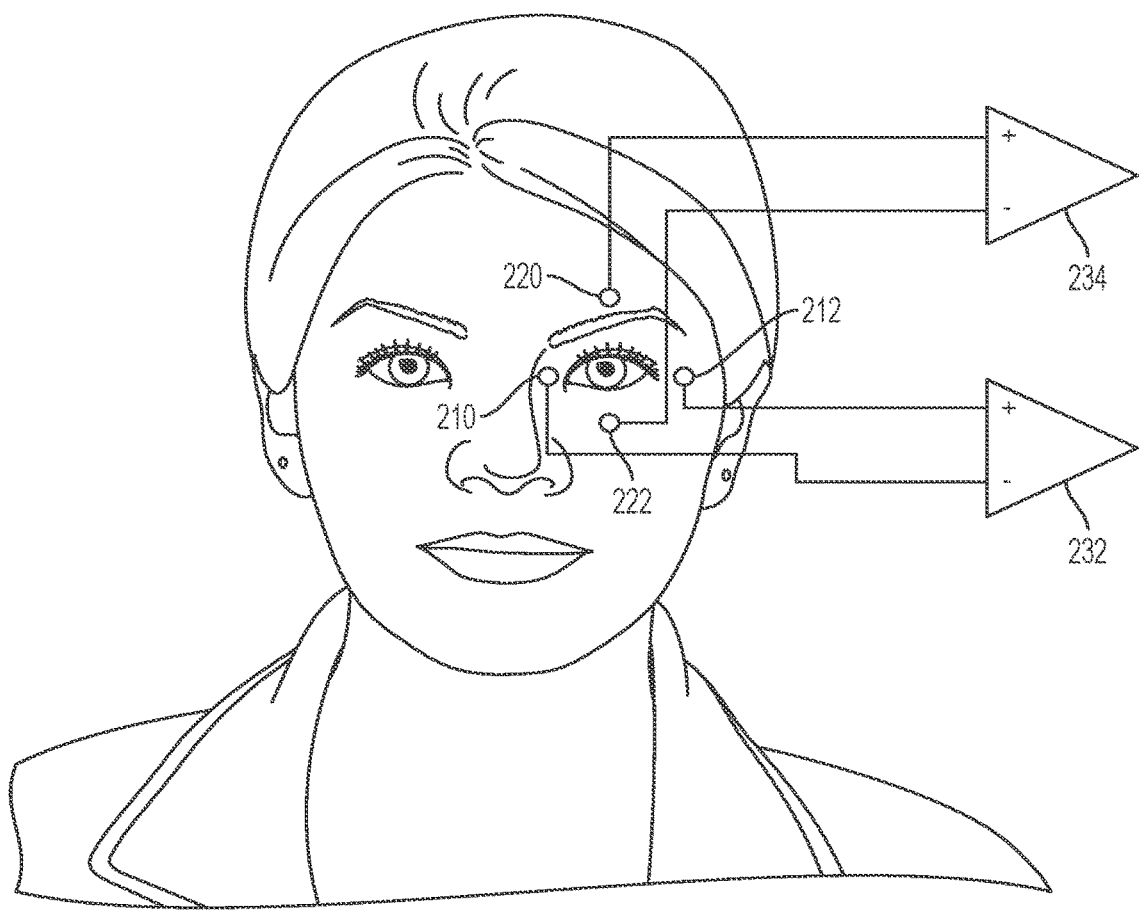
FIG. 2A illustrates an example of electrodes configured to detect eye movement according to examples of the disclosure.

Electrooculography is a technique for detecting the electrical potential between two locations of the eye (e.g., the cornea and the Bruch's membrane) using an electrooculography (EOG) sensor. Sensing circuitry can comprise one or more electrodes, and in some examples, one or more electrical components configured to measure an electrical potential difference between electrodes. Sensing circuitry can be placed on the head and/or face to record differences in electrical potential. FIG. 2A illustrates an example electrode configuration in example sensing circuitry. The amplitude of the electric potential of the eye is generally in the μV/degree range and may range, for example, from about 5 μV/degree to about 20 μV/degree. The sign of the electrode potential change may indicate the direction of eye movement (e.g., left, right, up, down). The relative position of the eye may be inferred from the measured electric potential. Facial muscles, when active, may affect potential on the surface of the face. The voltage seen across an electrode pair on the face may be expressed as a convolution of the eye muscle movement and facial muscle movement corresponding to facial features (e.g., blinking, winking, or scrunching of the face). For example, a blink has a characteristic signal pattern and duration as observed on an electrooculogram. An average blink rate at rest may vary between about 12 and 19 blinks per minute with an average duration between about 100 milliseconds and about 400 milliseconds. The electric potential of the eye may further provide insight into a user's state of mind, including, for example, an emotional state. (In examples of the disclosure, while reference is made to detecting electrical potential, in some examples, other suitable electrical properties (e.g., capacitance, inductance, resistance, impedance) may be detected, instead of or in addition to electrical potential, for the purposes of eye tracking.)

Multimodal Eye Tracking Systems

EOG sensors and optical sensors each may carry certain advantages over the other. For example, EOG sensors are generally more power-efficient than optical sensors. Further, EOG sensors may be less obtrusive than optical sensors, may not impair a user's vision, and may be more compatible with corrective lenses such as glasses and contact lenses. Signal measurements using electrodes may have high temporal resolution and allow for a continuous signal. EOG sensors, unlike optical sensors, are generally unaffected by bright light or darkness, and can operate in the absence of controlled lighting. Furthermore, unlike optical trackers, eye movements may be tracked even when the eyes are closed, or in other situations where the eye is visually obscured (e.g., by eyelids, eyelashes, etc.). In addition, EOG sensors, which produce output representing electrical potentials, may be less bandwidth intensive than optical sensors, which may output comparatively large image data. Moreover, it may be faster and more computationally efficient to process EOG data than optical sensor data. However, such optical sensor data (e.g., 2D images) may also provide for eye tracking with enhanced resolution and/or accuracy. That is, the position of the eye may be more reliably measured using an optical sensor (i.e., by extracting the eye position from image data) than using an EOG sensor (i.e., by inferring the eye position from electrical potentials). Similarly, compared to EOG sensors, optical sensors may benefit from limited drift from calibrated values.

Given the relative advantages of optical eye tracking and EOG eye tracking, it may be beneficial for eye tracking systems to incorporate multiple types of sensors, such as optical sensors and EOG sensors. As described in further detail below, such a multimodal eye tracking approach may be of particular benefit, for example, in systems with eye tracking functionality that may routinely consume relatively large amounts of power and/or routinely perform computationally-intensive operations. Such systems can include as augmented reality systems, virtual reality systems, and the like.

Figure 2B:
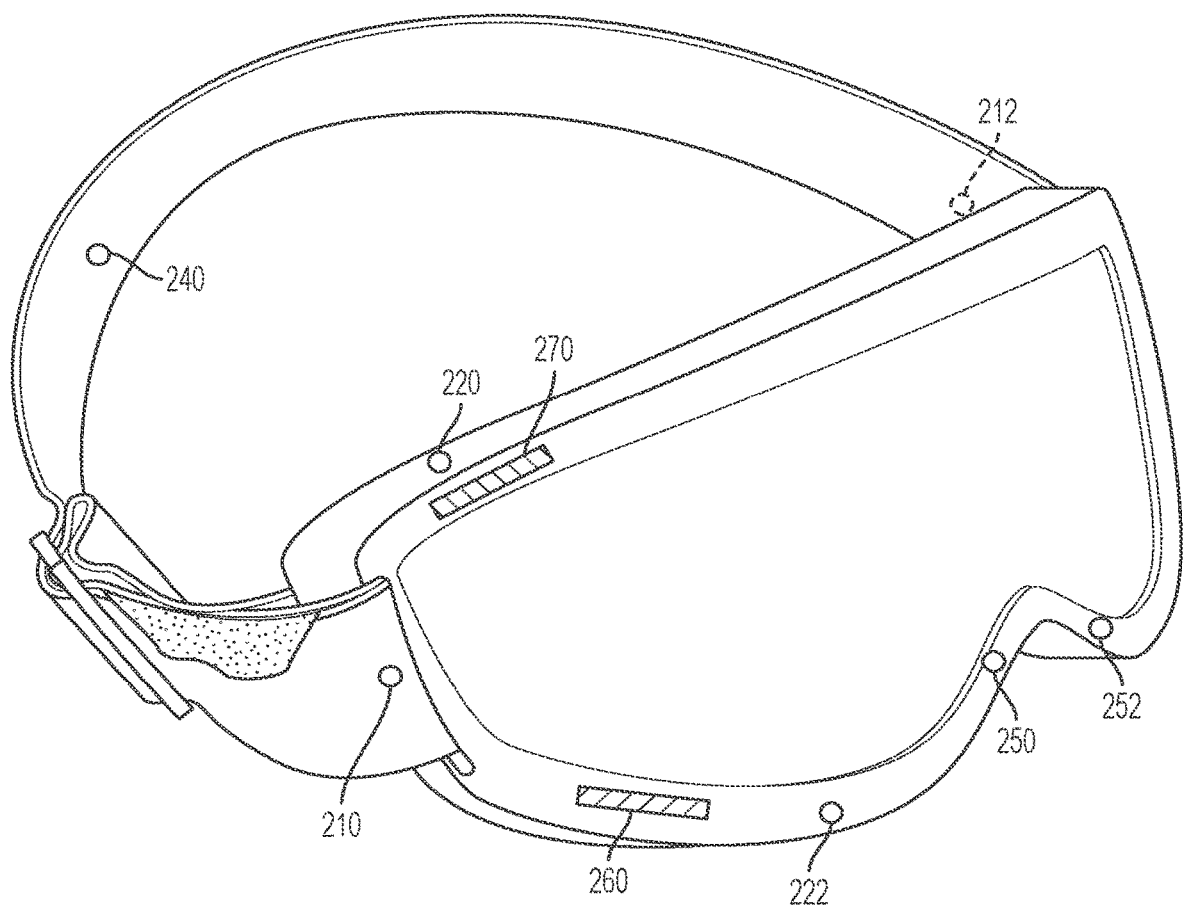
FIG. 2B illustrates an example head-mounted device according to examples of the disclosure.

FIG. 2B shows an example head-mounted device 200 that includes a multimodal eye tracking system. More specifically, in the example of FIG. 2B, the example head-mounted device 200 includes sensing circuitry comprising electrodes configured to contact the wearer's head and/or face (e.g., to provide EOG sensing functionality) and/or at least one optical sensor configured to monitor one or both of the wearer's eyes. Example device 200 may be employed in an augmented reality system, and may, for example, incorporate a display configured to present an augmented reality display to the wearer. Additional details regarding systems and techniques for providing electrooculography (EOG), optical eye tracking, and augmented reality functionality are provided in U.S. patent application Ser. No. 15/072,290, which is incorporated by reference herein in its entirety.

In some examples, at least some of the electrodes of the sensing circuitry of example head-mounted device 200 may be arranged according to the example electrode configuration illustrated in FIG. 2A. In the example of FIG. 2A, a first pair of electrodes (210 and 212) is configured to detect horizontal axis movement of an eye, and a second pair of electrodes (220 and 222) is configured to contact skin to detect vertical movement of an eye. In the example shown, electrodes 210 and 212 are configured to contact the skin about the medial and lateral canthi, respectively, of the left eye, and electrodes 220 and 222 are configured to contact the skin above and below the left eye, respectively. The electrodes may be placed as near the eye as practical to reduce interference. In example device 200, electrodes 210 and 212 are shown configured to contact the wearer's face about the lateral canthi of the right and left eyes, respectively, to detect horizontal eye movement, as described above. In example device 200, electrode 220 is shown configured to contact the wearer's face above the right eyebrow, and electrode 222 is shown configured to contact the wearer's face below the right eyelid, to detect vertical eye movement, as described above. Referring once again to FIG. 2A, in some examples, electrodes 210 and 212, and 220 and 222, are coupled to differential amplifiers 232 and 234, respectively, to amplify the signal produced by the electrodes. It follows that, in some examples, the example device 200 or another device operatively coupled to the example device 200 may include differential amplifiers 232 and 234 and/or other circuitry for conditioning signals produced in connection with two or more of the electrodes depicted in FIG. 2B.

Additionally, sensing circuitry can include a ground electrode to provide a reference electrical potential. It may be desirable to position a ground electrode on a region of the head or face whose electrical potential changes little, if at all, in response to eye movement. For instance, in example device 200, electrode 240 represents a ground electrode configured to contact the back of the wearer's head. In some examples, ground electrode 240 or another ground electrode may be configured to contact regions of the head or face including an earlobe, the forehead, or one or more anatomical regions adjacent an earlobe or the forehead. In example device 200, third and fourth electrodes 250 and 252 are shown configured to contact the bridge of the nose and/or the medial canthi of the eyes. EOG data from electrodes 250 and 252 may supplement the data provided by electrodes 210, 212, 220, and/or 222, which may simplify processing of data from those electrodes, may provide data redundancy, and/or may improve the robustness of the system. Additional electrodes may also be incorporated to provide similar benefits. The electrodes may be wet electrodes and/or dry electrodes. In some examples, the electrodes may be made of silver-silver chloride and/or be gold-plated. In some examples, shielding and/or noise cancellation techniques, such as the incorporation of a common mode rejection preamplifier, may be used reduce electromagnetic interference.

In some examples, such as example device 200 shown in FIG. 2B, an optical sensor (e.g., optical sensor 260 in FIG. 2B) may be mounted to a head-mounted device, such as may be used in an augmented reality system. This may provide the advantage that the optical sensor is relatively fixed relative to the eye, which minimizes the need to calibrate the sensor, and may simplify the process of analyzing the output of the optical sensor. In some examples, the optical sensor may be accompanied by a light source (e.g., light source 270 in FIG. 2B) to illuminate the eye and provide controlled, consistent lighting across optical sensor samples. In some examples, the head-mounted device may include a display via which, for instance, augmented reality content could be presented to the user. As described in further detail below with reference to FIGS. 3A-3B, in a multimodal eye tracking system including optical and EOG sensors, such as that of example device 200, the optical and EOG sensors may be utilized in a manner that leverages the abovementioned relative advantages of optical and EOG sensors to improve overall power efficiency and/or computational efficiency of the system.

Figure 3A:
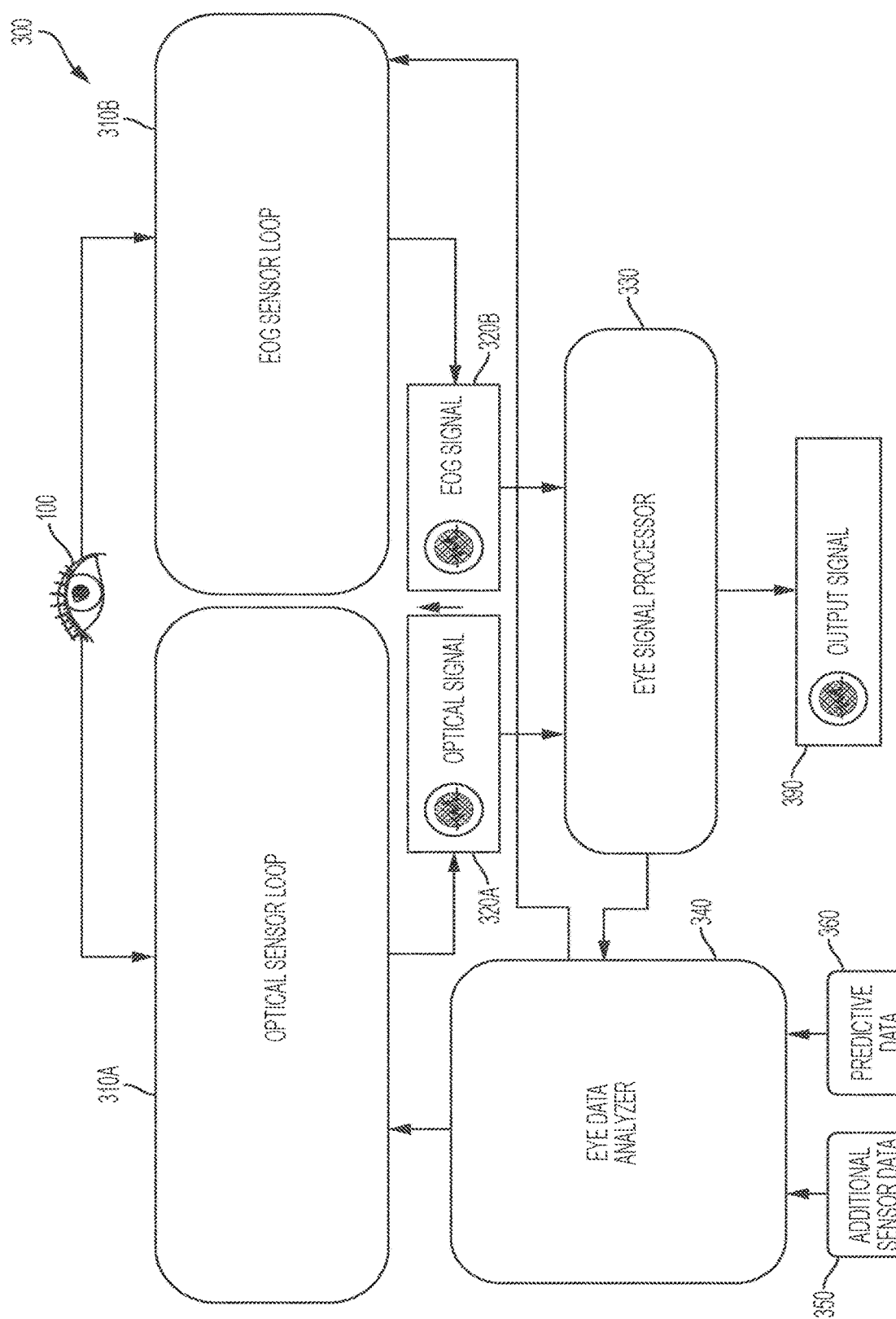
FIGS. 3A and 3B illustrate an example eye tracking system that uses multiple sensors to output a signal corresponding to a position and/or movement of an eye, according to examples of the disclosure.
Figure 3B:
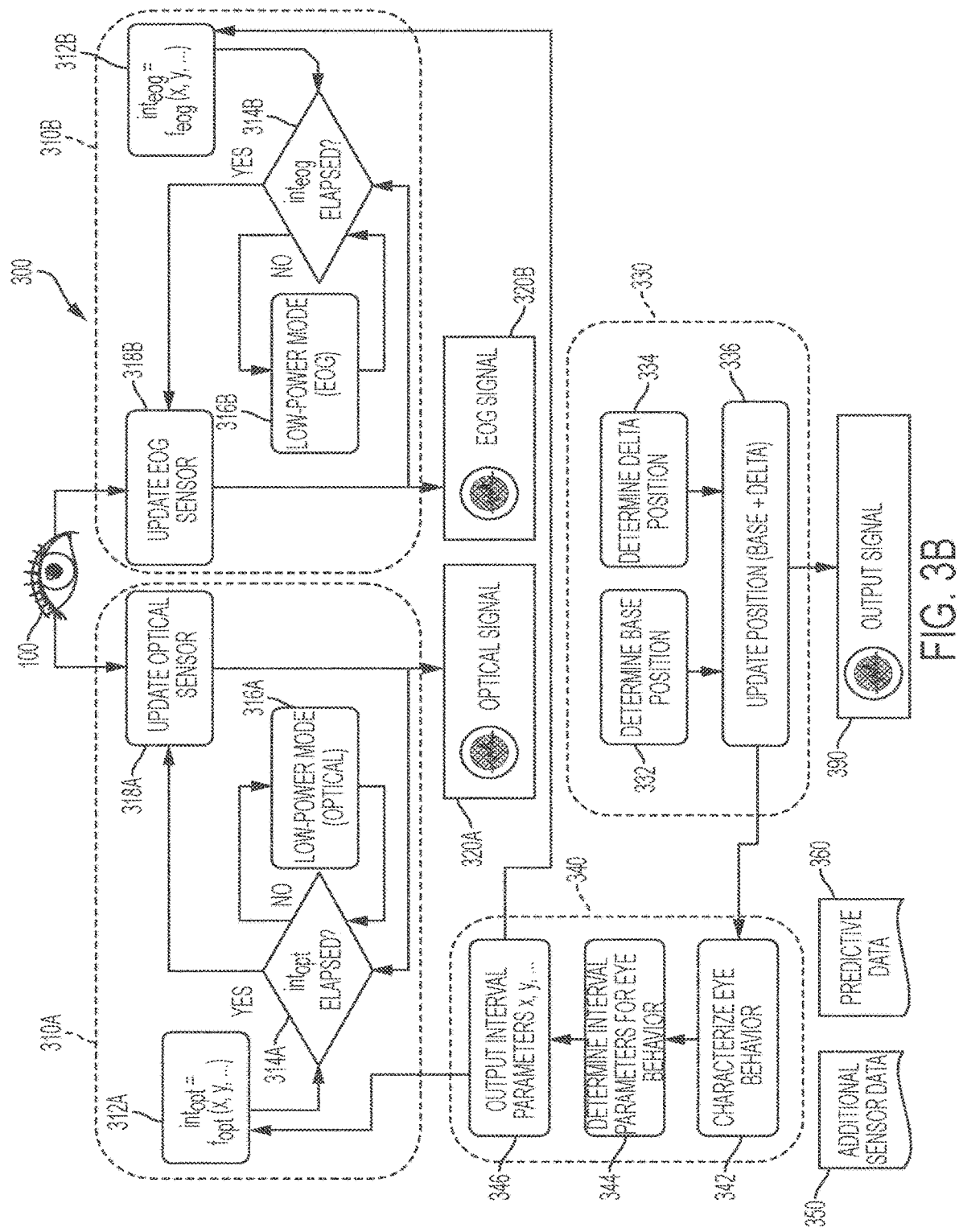

FIGS. 3A and 3B illustrate an example multimodal eye tracking system 300 that uses multiple sensors to output a signal 390 corresponding to a position and/or movement of eye 100, according to examples of the disclosure. In some examples, multimodal eye tracking system 300 may include or may be included as part of a head-mounted device, such as the example device 200 shown in FIG. 2B, with sensors (e.g., EOG sensors and/or optical sensors) configured to output data related to eye 100. In some examples, such a head-mounted device may be configured to operate with one or more processors configured to perform one or more functions related to tracking eye 100, such as described below. In some examples, such processors may be located in the head-mounted device itself. In some examples, such processors may be located in a wearable unit separate from the head-mounted device, such as a belt pack, or in a unit carried by the user. In some examples, such processors may be located external to the user, such as in a device not worn or carried by the user. In some examples, multimodal eye tracking system 300 may be incorporated in an augmented reality system, and may include a display configured to present augmented reality content to the user.

In example system 300, efficiencies in power and computational resources can be realized by controlling the rates at which sensor measurements of eye 100 are taken. Generally speaking, increasing sensor measurement rates can improve eye tracking accuracy, at the expense of consuming more power; conversely, decreasing sensor measurement rates can use less power, but may compromise eye tracking accuracy. The degree to which sensor measurement rates affect the tradeoff between accuracy and power consumption may change during system operation. In some examples, such as example system 300, sensor measurement rates may be continuously calculated and adjusted in real time, during system operation, to maintain a desired tradeoff between accuracy and power consumption. For example, example system 300 includes an eye data analyzer 340 that may perform such calculations and adjustments. Example multimodal eye tracking system 300 includes an optical sensor and an EOG sensor. However, in some examples, other sensors may be used. Further, in some examples, more than two sensors may be used. For example, an accelerometer could be used in conjunction with the optical sensor and EOG sensor to detect head movements, as described below. The examples below can be extended to accommodate additional sensors.

FIG. 3A shows a high-level overview of the example system 300 of FIGS. 3A and 3B. In the example, optical sensor loop 310A and EOG sensor loop 310B obtain respective sensor data from eye 100, and output optical signal 320A and EOG signal 320B, respectively. Optical signal 320A and EOG signal 320B are used as input by eye signal processor 330, which outputs output signal 390 based on an eye position determined from signals 320A and 320B. In some examples of the disclosure, such as example system 300, eye data analyzer 340 inputs eye position data from signal processor 330, and uses that data to determine parameters that affect the operation of optical sensor loop 310A and EOG sensor loop 310B. In some examples of the disclosure, such as example system 300, eye data analyzer 340 receives additional sensor data 350, and uses that data to determine parameters that affect the operation of optical sensor loop 310A and EOG sensor loop 310B. For example, additional sensor data 350 could be data from an accelerometer (such as configured to sense movements of a user's head), a GPS sensor, or another device. Examples of devices that may generate additional sensor data 350 are described further below. In some examples of the disclosure, such as example system 300, eye data analyzer 340 receives predictive data 360, and uses that data to determine parameters that affect the operation of optical sensor loop 310A and EOG sensor loop 310B. For example, predictive data 360 could be the output of a neural network configured to help eye data analyzer 340 determine an eye behavior that corresponds to one or more input signals.

One or more of the processes described herein with respect to example system 300, such as processes that may be performed by eye signal processor 330 and/or eye data analyzer 340, may be implemented in a computer system using any suitable logic circuitry. Suitable logic circuitry may include one or more computer processors (e.g., CPU, GPU, etc.) that, when executing instructions implemented in a software program, perform such processes. Additionally, such processes can also be implemented via corresponding logic design implemented in hardware logic circuitry, such as programmable logic (e.g., PLD, FPGA, etc.) or customized logic (e.g., ASIC, etc.) implementing logic designs that provide such processes. Furthermore, such processes can be provided via an implementation that combines both one or more processors running software and hardware logic circuitry. In some examples, components of example system 300, such as eye signal processor 330 and/or eye data analyzer 340, may correspond to dedicated hardware units, such as a computer processor configured to perform the functions of eye signal processor 330. In some examples, components of example system 300 may correspond to logical units implemented across one or more hardware units. In some examples, a single hardware unit, such as a computer processor, may perform all of the functions described herein with respect to multiple components of example system 300, such as eye signal processor 330 and eye data analyzer 340. In some examples, multiple hardware units (such as multiple computer processors) may collectively perform functions described herein with respect to a single component of example system 300, such as eye signal processor 330. The disclosure is not limited to any specific implementation.

FIG. 3B shows the example system 300 of FIG. 3A in more detail. In the example shown, optical sensor loop 310A includes logic controlling when an optical sensor obtains an updated measurement (318A) from eye 100. As described above, because obtaining an optical sensor measurement may be a power-intensive operation, it may be desirable to conserve power by limiting the rate at which such updates are performed. In the example, in optical sensor loop 310A, the rate at which the optical sensor measurement is obtained may be controlled at least in part by an interval value $\text{int}_{opt}$ (312A). In some examples, the value of $\text{int}_{opt}$ may be fixed—for example, at a specific time value, or at a specific number of iterations of optical sensor loop 310A. In some examples, the value of $\text{int}_{opt}$ may vary, for example according to a function $f_{opt}$. As described in more detail below, the function $f_{opt}$ may reflect various parameters, such as parameters x and y, that identify when and how it may be desirable to adjust the rate of updating the optical sensor measurement. In some examples where $\text{int}_{opt}$ is a time value, $\text{int}_{opt}$ can decrease (not shown in FIG. 3B) as time elapses during system operation, such that $\text{int}_{opt}$ represents a time remaining until the optical sensor measurement should be updated. At stage 314A of the example, the optical sensor loop 310A may read a current value of $\text{int}_{opt}$, and use the value to determine whether the optical sensor measurement should be updated. For example, if $\text{int}_{opt}$ is at or below a threshold value (e.g., zero), optical sensor loop 310A may determine at 314A that an updated optical sensor measurement should be obtained (318A), and may reset $\text{int}_{opt}$ to a value above the threshold. Meanwhile, if $\text{int}_{opt}$ is above the threshold value, optical sensor loop 310A at 314A may not proceed to obtain an optical sensor measurement, and may instead wait for $\text{int}_{opt}$ to reach the threshold value. In some examples, if $\text{int}_{opt}$ is above the threshold value, optical sensor loop 310A may enter a low power mode (316A), instead of obtaining an optical sensor measurement, until $\text{int}_{opt}$ reaches or falls below the threshold value. The low power mode may engage in power-saving behaviors, such as suspending a processor thread relating to the optical sensor. In some examples, an optical sensor measurement may be obtained upon the occurrence of an event (e.g., a user input), regardless of the state of $\text{int}_{opt}$. Such optical sensor measurements may be obtained instead of or in addition to any optical sensor measurements obtained once $\text{int}_{opt}$ reaches a threshold value. In iterations of optical sensor loop 310A in which an optical sensor measurement is obtained, that measurement is output as optical signal 320A.

In example system 300 shown in FIG. 3B, EOG sensor loop 310B includes logic controlling when an EOG sensor obtains an updated measurement (318B) from eye 100. In the example shown, EOG sensor loop 310B largely mirrors optical sensor loop 310A. As described above, the rate at which optical sensor measurements are obtained may be intentionally limited by optical sensor loop 310A to reduce power consumption. During periods where no optical sensor measurements are obtained, it may be desirable to obtain relatively power-efficient EOG sensor measurements instead of optical measurements. Additionally, some examples may detect measurement problems related to the optical sensor—for example, if measurements are compromised by occluding objects, such as eyelids, or by extreme lighting conditions—and compensate by adjusting the rate of updating EOG sensor measurements. In the example, in EOG sensor loop 310B, similar to optical sensor loop 310A, the rate at which the EOG sensor measurement is obtained may be controlled at least in part by an interval value $\text{int}_{eog}$ (312B). In some examples, the value of $\text{int}_{eog}$ may be fixed—for example, at a specific time value, or at a specific number of iterations of EOG sensor loop 310B. In some examples, the value of $\text{int}_{eog}$ may vary, for example according to a function $f_{eog}$. As described in more detail below, the function $f_{eog}$ may reflect various parameters, such as parameters x and y, that identify when and how it may be desirable to adjust the rate of updating the EOG sensor measurement. In some examples where $\text{int}_{eog}$ is a time value, $\text{int}_{eog}$ can decrease (not shown in FIG. 3B) as time elapses during system operation, such that $\text{int}_{eog}$ represents a time remaining until the EOG sensor measurement should be updated. At stage 314B of the example, the EOG sensor loop 310B may read a current value of $\text{int}_{eog}$, and use the value to determine whether the EOG sensor measurement should be updated. For example, if $\text{int}_{eog}$ is at or below a threshold value (e.g., zero) EOG sensor loop 310B may determine at 314B that an updated EOG sensor measurement should be obtained (318B), and may reset $\text{int}_{eog}$ to a value above the threshold. Meanwhile, if $\text{int}_{eog}$ is above the threshold value, EOG sensor loop 310B at 314B may not proceed to obtain an EOG sensor measurement, and may instead wait for $\text{int}_{eog}$ to reach the threshold value. In some examples, if $\text{int}_{eog}$ is above the threshold value, optical sensor loop 310B may enter a low power mode (316B), instead of obtaining an EOG sensor measurement, until $\text{int}_{eog}$ reaches or falls below the threshold value. The low power mode may engage in power-saving behaviors, such as suspending a processor thread relating to the EOG sensor. In some examples, an EOG sensor measurement may be obtained upon the occurrence of an event (e.g., a user input), regardless of the state of $\text{int}_{eog}$. Such EOG sensor measurements may be obtained instead of or in addition to any EOG sensor measurements obtained once $\text{int}_{eog}$ reaches a threshold value. In iterations of EOG sensor loop 310B in which an EOG sensor measurement is obtained, that measurement is output as EOG signal 320B.

In some examples, the maximum value of $\text{int}_{eog}$ may be less than the maximum value of $\text{int}_{opt}$, reflecting that EOG sensor measurements may be updated more frequently than optical sensor measurements. For instance, in example systems including an optical sensor that is less power efficient than an included EOG sensor, updating the EOG sensor more frequently, and updating the optical sensor less frequently, may help optimize the overall power consumption of the example system. In some examples, $\text{int}_{eog}$ and/or $f_{eog}$ may be configured such that the EOG sensor is updated at a frequency of about 500 Hz, and $\text{int}_{opt}$ and/or $f_{opt}$ may be configured such that the optical sensor is updated at a frequency of about 60 Hz. In some examples, other relationships between the $\text{int}_{eog}$ and $\text{int}_{opt}$ signals may be desirable. For example, maintaining a phase offset between the $\text{int}_{eog}$ and $\text{int}_{opt}$ signals such that an optical sensor and an EOG sensor are not updated simultaneously may be beneficial to avoid unpredictable sequencing (e.g., due to race conditions), improve throughput of eye signal processor 330, or promote load balancing.

In some examples, obtaining an EOG sensor measurement and/or an optical sensor measurement can be triggered by the occurrence of an event, in addition to or instead of a timer (e.g., a timer with a period of $\text{int}_{eog}$ or $\text{int}_{opt}$) reaching a threshold value. One such event may be the detection of a sufficiently large change in an EOG sensor or optical sensor measurement value, which may indicate a change in the state of a user's eye. As one example, an optical sensor, such as an eye tracking camera, may enter a low-power mode (e.g., 316A with respect to FIG. 3B), and remain in the low-power mode until the output of an EOG sensor changes by a sufficiently large amount (e.g., at stage 318B). Upon the detection of such a change, the optical sensor may exit the low-power mode, and a measurement may be read (e.g., an image may be captured) from the optical sensor. This may optimize power consumption by allowing the optical sensor to remain in the low-power mode when no sufficiently large change in EOG sensor is detected—which may correspond to the user's eye position remaining stationary, a situation in which there may be a reduced need for updated optical sensor measurements of the eye. Power savings can be especially pronounced in situations where the eye is expected to remain largely stationary for an extended period of time—for example, while the user is sleeping, or while the eye is fixated on a specific point (e.g., while watching a television screen)—because there is limited need for optical sensor measurements during such situations.

Further power savings can be realized by forgoing computationally expensive operations—such as performing image processing on an output of an optical sensor—when an EOG sensor output indicates that the eye position remains stationary. For instance, if the output of the EOG sensor remains constant, this indicates that the eye is stationary, and that image processing of an image of that eye would not likely yield new information over previous image processing. Accordingly, in an example system that is configured to apply image processing to the output of an optical sensor, such as an eye tracking camera, the system may be configured to perform the image processing in response to a determination that the output of an EOG sensor has changed by a sufficiently large amount (e.g., at stage 318B). In some examples, a system including an eye tracking camera can be configured to capture an image, and perform image processing on that image (e.g., to determine eye gaze) in response to a determination that the output of an EOG sensor has changed by a sufficiently large amount.

In example system 300 shown in FIG. 3B, optical signal 320A and EOG signal 320B are input to eye signal processor 330. Eye signal processor may also input time values (not shown in FIG. 3B) corresponding to the times at which the sensor measurements underlying signals 320A and 320B were obtained. In the example shown, a role of eye signal processor 330 is to determine an updated eye position based on signals 320A and 320B.

In some examples, such as example system 300, optical signal 320A (which represents the position of eye 100 with respect to an imaging device) corresponds to a base position of eye 100—that is, a current position of eye 100 that is independent of previous positions of eye 100. Eye signal processor 330 may determine at stage 332 a base position of eye 100 from optical signal 320A. For instance, eye signal processor 330 may identify a correlation between values of optical signal 320A and positions of eye 100, for example by relating optical signal 320A to various system parameters (such as parameters relating to the placement of the optical sensor, to environmental conditions, and/or to the appearance of the user's eye), and determine a position of eye 100 based on that correlation. Because optical sensors are subject to false measurements, for example resulting from occlusion by foreign objects (e.g. eyelids or eyelashes) or from problematic lighting conditions, eye signal processor 330 may include logic for correcting false optical measurements. For example, eye signal processor 330 may reject outlier measurements that are inconsistent with neighboring measurements. Signal processor 330 may also make use of output of eye data analyzer 340, as described below, to more accurately determine base eye positions from EOG signals.

Likewise, in some examples, EOG signal 320B (which represents electrical signals generated by moving eye muscles) corresponds to a delta of a position of eye 100—that is, a degree to which a position of eye 100 has changed since a previous position of eye 100. Eye signal processor 330 may determine at stage 334 a position delta of eye 100 from EOG signal 320B. For example, eye signal processor 330 may use a known correlation among EOG signals and eye muscle activity to determine a matrix describing the muscle movement corresponding to a value of EOG signal 320B. Eye signal processor 330 may then accumulate matrices corresponding to successive values of EOG signal 320B (each representing individual eye movements) to determine a net position delta of eye 100 represented by those successive values. Because accumulator systems (such as for obtaining net displacements from differential movements) may be subject to drift, eye signal processor 330 may include logic for correcting drift—for example, by comparing gradual changes in position deltas against gradual changes in base positions computed at stage 332, and canceling deviations. Additionally, because EOG sensor measurements may be subject to electronic noise and/or interference, such as crosstalk, signal processor 330 may include mechanisms (such as crosstalk cancellation filters) to correct for such noise and/or interference. Signal processor 330 may also make use of output of eye data analyzer 340, as described below, to more accurately determine eye position deltas from EOG signals.

In some examples, eye signal processor 330 may then calculate (336) an eye position as a sum of a base position (determined at stage 332 from optical signal 320A, as described above) and a delta position (determined at stage 334 from EOG signal 320B, as described above). The output of this calculation may produce output signal 390, representing the eye position, which may be used in a variety of applications as described above.

In some examples that include a display, such as a head-mounted display, the eye position may be used to enable the display to present information on a region of the display that is within a user's line of sight, or otherwise viewable to the user. For example, a head-mounted display may be fixed to a user's head at a known distance from the user's eye. The position of the eye can be used, in conjunction with the known distance from the eye to the display, to identify a region of the display at which the user is currently looking. A display state of that region may then be changed, with the knowledge that the user, based on his or her current eye position, is likely to immediately notice the change in the display state. For example, an important message could be displayed directly in the user's line of sight. In examples in which the display presents a 3D environment, such as in a virtual reality or augmented reality system, a virtual object may appear at the precise location in the 3D environment at which the user is currently looking, enhancing a user's sense of immersion or control.

Similarly, the position of the eye can be used, in conjunction with the distance from the eye to the display, to identify a region of the display at which the user is not currently looking. A display state of that region may then be changed, with the knowledge that the user, based on his or her current eye position, is not likely to immediately notice the change in the display state. In examples in which the display presents a 3D environment, such as in a virtual reality or augmented reality system, it may be desirable for virtual objects to inconspicuously enter or exit the environment, or to change a state of a virtual object (such as the resolution of an asset used to render the object) without the user noticing. Such behaviors may enhance a user's feeling of immersion in a 3D environment. This can be accomplished by identifying a region of the display where the user is not looking, and changing a display state in that region.

Some examples may include an eye data analyzer, such as eye data analyzer 340 shown in FIG. 3B, to refine and improve the operation of example system 300. In example system 300, eye position data from eye signal processor 330 (such as base position data determined at stage 332 and/or delta position data determined at stage 334) may be input to eye data processor 340, which may be collected and stored by eye data processor. In some examples, such as example system 300, additional sensor data 350 and/or predictive data 360 are also input to eye data processor 340. At stage 342, eye data processor 340 may analyze eye position data from eye signal processor 330—and, in some examples, additional sensor data 350 and/or predictive data 360—to identify patterns and characteristics of the movements and behavior of eye 100 over time. Such patterns and characteristics may reveal ways in which example system 300 could operate more effectively.

In some examples, eye signal processor 330 and/or eye data analyzer 340 may determine a probability, rather than a certainty, of the occurrence of an eye behavior. These probabilities may be determined using statistical methods. In some examples, eye signal processor 330 and/or eye data analyzer 340 may generate and/or apply a statistical model that predicts the output of a system (e.g., a type of eye behavior) given the state of various inputs (e.g., eye position measurements). In some examples, eye signal processor 330 and/or eye data analyzer 340 may determine a probability by identifying or adjusting the weight or influence of one or more factors that bear on that probability. For example, eye signal processor 330 and/or eye data analyzer 340 may determine that, of several possible eye behaviors, one particular eye behavior is the most likely to occur given the current values of various weighted factors (even though that behavior may not necessarily occur). Similarly, eye signal processor 330 and/or eye data analyzer 340 may make predictions of future behavior based on various weighted factors, even though they cannot determine such future behavior with certainty. This reflects that, in many cases, it is difficult or impossible to conclude with certainty that an eye is engaged in a particular behavior; further, it is difficult or impossible to predict future eye behaviors. However, absolute certainty of the occurrence of an eye behavior may not be necessary for many applications; and advantages (e.g., power efficiency and computational efficiency) may be conveyed by a determination of the relative likelihoods of certain eye behaviors, or by an educated guess as to the likelihood of future eye behaviors.

Statistical methods may be employed to determine a probability of the occurrence of an eye behavior. For example, a confidence score may be assigned to the likelihood of a particular behavior occurring. The confidence score may be compared to a threshold value, and on determining that the confidence score exceeds the threshold value, eye signal processor 330 and/or eye data analyzer 340 may determine that the behavior associated with the confidence score is likely to occur with a sufficient probability. Other statistical methods may also be employed.

As one example of identifying an eye behavior, at stage 342, eye data analyzer 340 may determine, from eye position data from eye signal processor 330, that eye 100 is fixated on a stationary focal target. For example, eye data processor may make such a determination based on data indicating that the eye is executing only small, high-frequency movements—a condition characteristic of the eyes fixating on a stationary target. The position of eye 100 can be expected to change little, if at all, while so fixated. Under such conditions, it may be acceptable to decrease the rate at which optical and/or EOG sensors obtain new measurements (such as by increasing $int_{opt}$ and/or $int_{eog}$), because each new measurement may be expected to provide little new position information of significance. Eye signal processor 330 may also adjust its computations of eye position to reflect that signals 320A and 320B are unlikely to present significant changes in position while eye 100 is engaged in fixation, potentially resulting in greater eye tracking accuracy.

As another example, at stage 342, eye position data from eye signal processor 330 may indicate that the movement of eye 100 is rapidly changing direction—a condition that suggests that eye 100 is engaging in saccadic behavior. When the eye is engaged in saccadic behavior, a signal describing the eye position may contain large amounts of high frequency information. In response to identifying such saccadic behavior, eye data processor 340 may increase the rate at which an EOG sensor is updated (such as by decreasing $int_{eog}$), such that high frequency information in the eye position signal can be accurately captured without aliasing.

In some examples, eye data processor 340 may make use of additional sensor data 350, such as from sensors other than optical sensors and EOG sensors, to identify eye behaviors more effectively than might otherwise be possible. In some examples, machine learning techniques may be employed to improve the identification of eye behaviors. As one example, a neural network could be trained, using additional sensor data 350 associated with an individual user, to identify that user's eye behaviors based on additional sensor data 350. As another example, generalized neural networks could be trained using additional sensor data 350 associated with groups of users, rather than for individual users. Such neural networks may be recursively trained using data from example system 300, such as output signal 390. As another example, genetic algorithms may be used to identify relationships between input data, including additional sensor data 350, and eye behaviors. Other machine learning techniques, such as support vector machines, Bayesian networks, rule-based systems, and learning classifier systems, and including deep learning techniques, can similarly be employed. In some examples, these techniques are implemented within eye data processor 340. In some examples, these techniques are implemented in other components of example system 300. In some examples, these techniques are implemented at least partially in systems external to example system 300. For instance, a remote server may train a neural network on large sets of data, and communicate parameters or output of that neural network to example system 300 via a computer network.

As one example of utilizing additional sensor data 350, additional sensor data 350 may include data from an accelerometer configured to detect head movements. An accelerometer outputs a value that corresponds to the acceleration of the accelerometer relative to the inertial frame; thus, if an accelerometer is affixed to a human head, the output of the accelerometer may correspond to the acceleration of the head. A high output value from such an accelerometer may indicate that there is significant head movement—for example, because a person is observing a fast-moving object, or craning his or her neck to view an object at the periphery of vision. Conversely, a low output value from the accelerometer may indicate that the head is relatively motionless—for example, while reading a book. If accelerometer data indicates that there is significant head movement, eye data processor 340 may conclude that eye 100 is engaged in vestibulo-ocular movement, such as where the eye moves in conjunction with the head or neck muscles, as described above. Because vestibulo-ocular movement may be associated with eye movements of relatively small magnitude (for example, because head movement makes large eye movements unnecessary), eye data processor 340 may decrease the rate at which an optical sensor is updated (such as by increasing $int_{opt}$, reducing accordingly the power consumed by the optical sensor), to reflect that the base position of the eye may not be expected to experience sudden large shifts. Conversely, if additional sensor data 350 includes accelerometer data that indicates there is no significant head movement, eye data processor may conclude that eye 100 is more likely to be engaging in saccadic movement (such as while reading a book with minimal head movement) than it would be otherwise. In examples making use of machine learning techniques, such techniques could be employed to identify associations between accelerometer data and eye behaviors. For example, a neural network could be trained to associate specific patterns of accelerometer data (e.g., sinusoidal output corresponding to simple harmonic motion) with particular eye behaviors that correlate to those patterns. Further, in some examples, a gyroscope, electric compass, magnetometer, inertial measurement unit, or other device may be used instead of, or in addition to, an accelerometer.

Other types of additional sensor data 350 may also be used to beneficial effect. In some examples, additional sensor data 350 may include data from ambient light sensors. Eye data processor 340 may use this data to identify eye behaviors associated with certain light conditions, or to help eye signal processor 330 correct for changes in lighting conditions. For instance, because pupils of eye 100 may contract in response to exposure to increased light levels, additional sensor data 350 indicating increased light levels may indicate that a contraction in pupil size is to be expected; in response, an optical sensor may prepare to recalibrate for use with a smaller pupil. Different eye tracking algorithms may also be employed by eye signal processor 330 to accommodate the smaller pupil size. As another example, additional sensor data 350 may include ambient light data indicating it is too dark for an optical sensor to work properly. Eye data processor 340 may use this information to slow or stop updating the optical sensor (for example, by increasing $int_{opt}$) under such conditions. In some examples, additional sensor data 350 may provide information that could also be determined from a sensor such as an optical sensor. In such examples, efficiencies may be gained by using comparatively power-efficient sensors, such as ambient light sensors, to perform work that would otherwise be performed by cameras or other less efficient sensors. In examples making use of machine learning techniques, such techniques could be employed to identify associations between sensors such as ambient light sensors and eye behaviors. For example, a neural network could be trained to associate changes in ambient light with particular eye behaviors, such as pupil dilation and contraction, that correlate to those changes.

In some examples, additional sensor data 350 may include time and/or location data, such as from a GPS sensor. Eye data processor 340 may use this data to identify eye behaviors associated with specific times and locations. As one example, additional sensor data 350 may include location data that indicates that a user is stationary, and inside a building, at night; and may thus be more likely to engage in reading, and saccadic eye movements, than otherwise. As another example, additional sensor data 350 may include time data, which can be used by eye data processor 340 to identify routine behavior (such as a daily commute from 6:00 to 7:00), and to predict eye movement based on that behavior. As another example, additional sensor data 350 may include location data that indicates a user is driving a vehicle, and that the user's eyes are more likely to engage in saccadic movements than otherwise. In examples making use of machine learning techniques, such techniques could be employed to identify associations between time and/or location data and eye behaviors. For example, a neural network could be trained to associate the time of day with particular eye behaviors that correlate to particular times.

In some examples, eye data processor 340 may be aided by map data, such as commercial map data that correlates geographic coordinates (such as from a GPS sensor) to specific buildings, businesses, or landmarks. For example, additional sensor data 350 may include location data that can be used in conjunction with map data to indicate that a user is at the gym, and may thus be more likely to be engaging in exercise, and thus vestibulo-ocular movement, than otherwise. Likewise, additional sensor data 350 may include location data that can be used in conjunction with map data to indicate that a user is at a movie theater, and the user's eye may be likely to be engaged in fixation behaviors (such as while watching a movie screen) for a period of several hours. In examples making use of machine learning techniques, such techniques could be employed to identify associations between map data and eye behaviors. For example, a neural network could be trained to associate a user's location with particular eye behaviors that tend to happen at that location.

In some examples, additional sensor data 350 may include data related to a medical condition that may be relevant to eye behaviors associated with that condition. For instance, if additional sensor data 350 indicates that the user has amblyopia (lazy eye)—a condition that may result in unusually high amounts of noise in an eye tracking system—eye data processor 340 may use this information to predict and reduce high noise levels. In addition, eye data processor may adjust the update rates of an optical sensor and/or an EOG sensor to accommodate the fact that the user's eye may not engage in normal movements as a result of the medical condition. In examples making use of machine learning techniques, such techniques could be employed to identify associations between medical information and eye behaviors. For example, a neural network could be trained to associate certain medical conditions with particular eye behaviors that accompany those medical conditions.

In some examples, additional sensor data 350 may include data relating to a user's usage of a computer system; in particular, in examples in which an eye tracking system integrates with a computer system (for example, to provide input to that computer system), the computer system may indicate that the user is using specific software that may indicate certain eye behaviors. For example, additional sensor data 350 may indicate that the user is using an e-book reader program to read text; eye data processor 340 may use this information to predict that the user is engaged in saccadic movements associated with reading. As another example, additional sensor data 350 may include data indicating where objects appear on a user's display. Because a user may be expected to look at such objects, eye data processor 340 may use this information to predict what the user's eyes are likely to focus on. For example, such information can be used to predict that eye 100 will engage in object tracking behavior, with the display coordinates of the tracked object indicated by additional sensor data 350. In examples making use of machine learning techniques, such techniques could be employed to identify associations between computer system usage and eye behaviors. For example, a neural network could be trained to associate certain computer usage conditions (such as the operation of a particular software application) with particular eye behaviors that accompany those usage conditions.

In some examples, eye data processor 340 may use predictive data 360 in combination with eye position data (such as from eye signal processor 330) and/or additional sensor data 350, to more accurately identify or predict eye behaviors. Predictive data 360 may include information that correlates input data (such as eye position data) to a likelihood of some output eye behavior (e.g., saccadic movement). Various machine learning techniques may be employed to generate predictive data 360. In some examples, a neural network could be trained, using known eye position data and eye behaviors from an individual user, to generate predictive data 360 that correlates eye behaviors with eye position data from that user. In some examples, generalized neural networks could be trained for use with groups of users, rather than for individual users. In some examples, predictive data 360 generated from unsupervised learning techniques may be used to identify relationships between input data and eye behaviors, which may improve the accuracy of an eye data processor 340, and may make example system 300 more useful to large and diverse groups of users. In some examples, predictive data 360 generated from deep learning techniques, may be used to identify relationships between input data and eye behaviors, particularly where little is known a priori about the input data. In some examples, genetic algorithms may be used to identify relationships between input data, including additional sensor data 350, and eye behaviors. Other machine learning techniques, such as support vector machines, Bayesian networks, rule-based systems, and learning classifier systems, can similarly be employed.

In some examples, predictive data 360 may be communicated to example system 300 by an external source. For instance, a neural network could be trained on a remote server, with parameters or output of that neural network communicated to example system 300 as predictive data 360. Such a configuration may be particularly beneficial in examples making use of large sets of eye data, such as from a large number of users, to which the local application of machine learning techniques may be computationally prohibitive. However, in some examples, such as those involving "light" implementations of machine learning techniques, predictive data may be generated locally to example system 300.

In some examples, such as shown in FIG. 3B, after eye data processor 340 characterizes at stage 342 the behavior of eye 100, eye data processor 340 may determine at stage 344 one or more optical sensor parameters and/or sensing circuitry parameters. Optical sensor parameters or sensing circuitry parameters can include interval parameters which define the rates at which optical sensor loop 318A and EOG sensor loop 318B update their respective loops. For example, if eye data processor 340 determines, based on current eye behavior (e.g., as detected by an image of the eye output by an optical sensor), that power consumption can be safely reduced by reducing the optical sensor update rate, eye data processor 340 can directly or indirectly increase the value of $int_{opt}$, to increase the time between optical sensor updates as described above (thus reducing the optical sensor update rate). Eye data processor 340 may similarly adjust the value of $int_{eog}$ to adjust the time between EOG sensor updates, as described above. In some examples, eye data processor 340 may adjust other system parameters, such as parameters for filtering noise from optical signal 320A and/or EOG signal 320B, based on determinations regarding eye behavior. In some examples, eye data processor 340 may perform other operations, such as priming an optical sensor or calibrating an optical sensor or an EOG sensor, based on determinations regarding eye behavior.

In example system 300 shown in FIG. 3B, $int_{opt}$ and $int_{eog}$ may be set as the outputs of functions $f_{opt}$ and $f_{eog}$, respectively, which functions may accept one or more parameters (e.g., x, y) from eye data processor 340 at stage 346. For example, such parameters may correspond to categories of high-level eye behaviors, frequency components of eye movements, and other aspects of eye movement. Such parameters may also correspond to information not directly related to eye movement, such as current battery life (which, when low, may call for less frequent sensor measurements). In such example systems, $f_{opt}$ and $f_{eog}$ may be configured to allow eye data processor 340 to continually adjust sensor update rates, via parameters of $f_{opt}$ and $f_{eog}$, to maintain an optimal tradeoff between eye tracking accuracy and power consumption.

Figure 4:
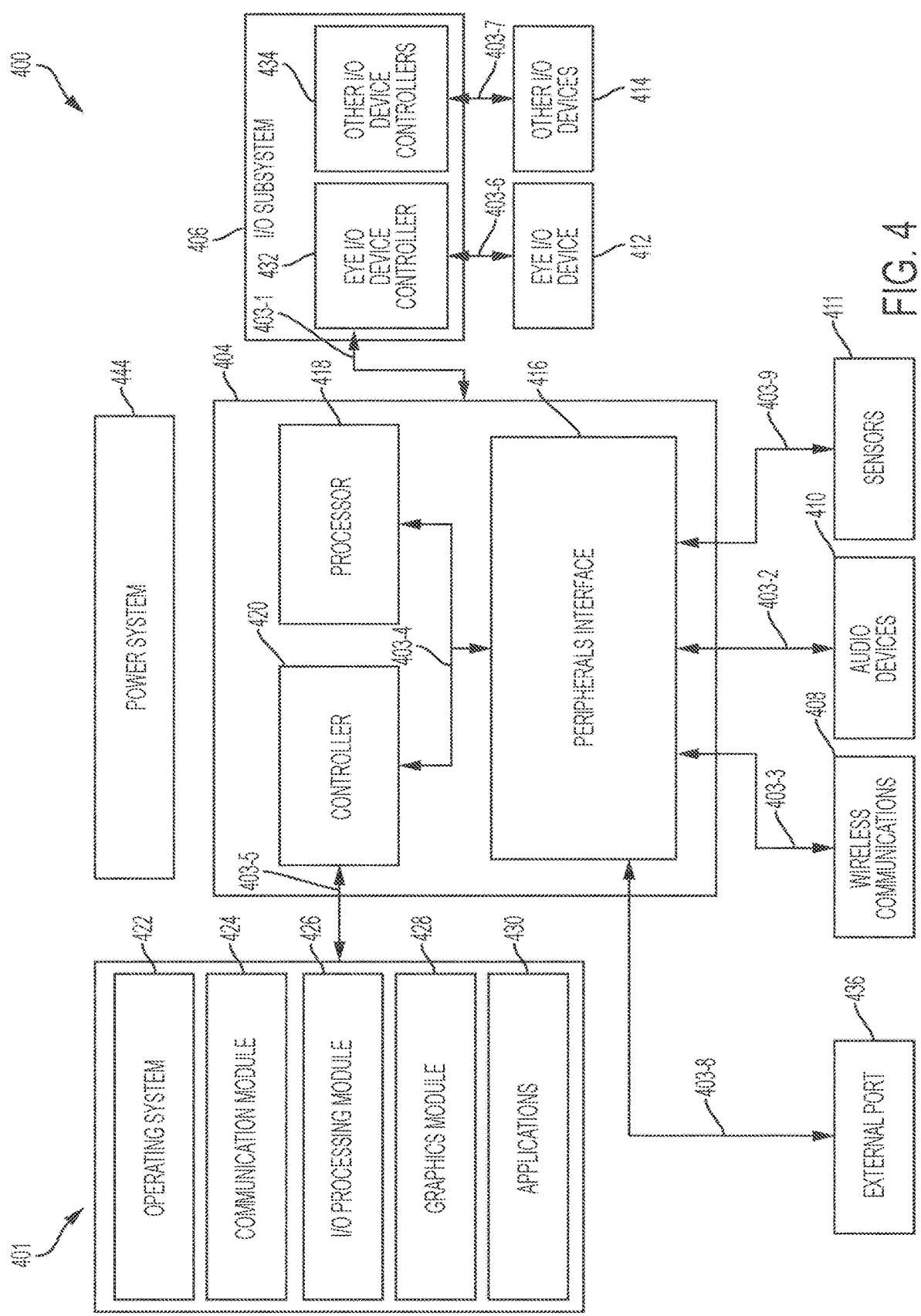
FIG. 4 illustrates an example of a system architecture that may be embodied within any portable or non-portable device according to examples of the disclosure.

FIG. 4 illustrates an example system 400 that may be used to implement any or all of the above examples. Example system 400 may be included in a portable device (including a wearable device) or a non-portable device—for example, a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, a head-mounted device (which may include, for example, an integrated display), or any other system or device adaptable to include example system 400, including combinations of two or more of these types of devices. The above examples may be embodied in two or more physically separate devices, such as two or more computers communicating via a wireless network. The above examples may be embodied in two or more physically different devices, such as a belt pack that communicates data to and/or from a head-mounted display. Example system 400 includes one or more computer-readable mediums 401, processing system 404, I/O subsystem 406, wireless communications circuitry (e.g., RF circuitry) 408, audio devices (e.g., speaker, microphone) 410, and sensors 411. These components may be coupled by one or more communication buses or signal lines 403.

The architecture shown in FIG. 4 is only one example architecture of example system 400, and example system 400 may have more or fewer components than shown, or a different configuration of components. The various components shown in FIG. 4 may be implemented in hardware, software, firmware or any combination thereof, including one or more digital signal processors (DSP) and/or application specific integrated circuits (ASIC).

Referring to example system 400 in FIG. 4, the wireless communications circuitry 408 can be used to send and receive information over a wireless (e.g., RF) link or network to one or more other devices and may include circuitry for performing this function. The wireless communications circuitry 408 and the audio devices 410 can be coupled to the processing system 404 via peripherals interface 416. The peripherals interface 416 can include various known components for establishing and maintaining communication between peripherals (e.g., wireless communications circuitry 408, audio devices 410, and sensors 411) and the processing system 404. The audio devices 410 can include circuitry for processing voice signals received from the peripherals interface 416 to enable a user to communicate in real-time with other users. The audio devices 410 may include, for example, one or more speakers and/or one or more microphones. In some examples, the audio devices 410 can include a headphone jack (not shown).

The sensors 411 can include various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, an electrooculography (EOG) sensor, and various system sensors which can sense remaining battery life, power consumption, processor speed, CPU load, and the like. In examples such as involving a head-mounted device (which may include a display), one or more sensors may be employed in connection with functionality related to a user's eye, such as tracking a user's eye movement, or identifying a user based on an image of his or her eye.

The peripherals interface 416 can couple input and output peripherals of the system 400 to one or more processors 418 and one or more computer-readable mediums 401. The one or more processors 418 may communicate with the one or more computer-readable mediums 401 via a controller 420. The computer-readable medium 401 can be any device or medium (excluding signals) that can store code and/or data for use by the one or more processors 418. In some examples, the computer-readable medium 401 can be a non-transitory computer-readable storage medium. The computer-readable medium 401 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact discs) and DVDs (digital video discs). The computer-readable medium 401 may also include a transmission medium for carrying information-bearing signals indicative of computer instructions or data (but excluding the signals and excluding a carrier wave upon which the signals are modulated). For example, the transmission medium may include a communications network, including but not limited to the Internet (including the World Wide Web), intranet(s), Local Area Networks (LANs), Wide Local Area Networks (WLANs), Storage Area Networks (SANs), Metropolitan Area Networks (MANs) and the like.

The one or more processors 418 can run various software components stored in the computer-readable medium 401 to perform various functions for the example system 400. In some examples, the software components can include operating system 422, communication module (or set of instructions) 424, I/O processing module (or set of instructions) 426, graphics module (or set of instructions) 428, and one or more applications (or set of instructions) 430. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, the computer-readable medium 401 may store a subset of the modules and data structures identified above. Furthermore, the computer-readable medium 401 may store additional modules and data structures not described above.

The operating system 422 can include various procedures, sets of instructions, software components and/or drivers for controlling and managing general system tasks (e.g., memory management, storage device control, power management, etc.) and facilitates communication between various hardware and software components.

The communication module 424 can facilitate communication with other devices over one or more external ports 436, or via the wireless communications circuitry 408 and can include various software components for handling data received from the wireless communications circuitry 408 and/or the external port 436.

The graphics module 428 can include various known software components for rendering, animating and displaying graphical objects on one or more display surfaces. Display surfaces may include 2D or 3D displays. Display surfaces may be directly or indirectly coupled to one or more components of the example system 400. In examples involving a touch sensing display (e.g., touch screen), the graphics module 428 can include components for rendering, displaying, and animating objects on the touch sensing display. In some examples, the graphics module 428 can include components for rendering to remote displays. In some examples, such as those incorporating a camera, the graphics module 428 can include components for creating and/or displaying an image formed by compositing camera data (such as captured from a head-mounted camera) or photographic data (such as satellite-captured imagery) with rendered graphical objects. In some examples, the graphics module 428 can include components for rendering an image to a head-mounted display. In some examples, an image may include a view of an element of virtual content (e.g., an object in a three-dimensional virtual environment), and/or a view of the physical world (e.g., camera input indicating the user's physical surroundings). In some examples, a display may present a composite of virtual content and a view of the physical world. In some examples, the view of the physical world may be a rendered image; in some examples, the view of the physical world may be an image from a camera.

The one or more applications 430 can include any applications installed on example system 400, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

The I/O subsystem 406 can be coupled to the one or more I/O devices 414 for controlling or performing various functions. In examples involving processing of eye data, such as examples including eye tracking or iris recognition functionality, the I/O subsystem 406 may be coupled to the one or more I/O devices 412 dedicated to handling eye-related input and output. The one or more eye I/O devices 412 can communicate with processing system 404 via the eye I/O device controller 432, which can include various components for processing eye input (e.g., sensors for eye tracking) or user gesture input (e.g., optical sensors). The one or more other I/O controllers 434 can send and receive electrical signals to and from the other I/O devices 414. Such I/O devices 414 may include physical buttons, dials, slider switches, sticks, keyboards, touch pads, additional display screens, or any combination thereof.

The I/O processing module 426 can include various software components for performing various tasks associated with one or more eye I/O devices 412 and/or the one or more other I/O devices 414, including but not limited to receiving and processing input received from the eye I/O devices 412 via eye I/O device controller 432, or from the other I/O devices 414 via I/O controllers 434. In some examples, the I/O devices 414 and/or the I/O processing module 426 may perform various tasks associated with gesture input, which may be provided by tactile or non-tactile means. In some examples, gesture input may be provided by a camera or another sensor for detecting movements of a user's eyes, arms, hands, and/or fingers, for example. In some examples, the one or more I/O devices 414 and/or the I/O processing module 426 may be configured to identify objects on a display with which the user wishes to interact—for example, GUI elements at which a user is pointing. In some examples, the one or more eye I/O devices 412 and/or the I/O processing module 426 may be configured (such as with the assistance of optical or EOG sensors) to perform eye tracking tasks, such as identifying an object, or a region on a display, at which the user is looking. In some examples, a device (such as a hardware "beacon") may be worn or held by a user to assist the one or more I/O devices 414 and/or the I/O processing module 426 with gesture-related tasks, such as identifying the location of a user's hands relative to a 2D or 3D environment. In some examples, the one or more eye I/O devices 412 and/or the I/O processing module 426 may be configured to identify a user based on sensor input, such as data from a camera sensor, relating to the user's eye.

In some examples, the graphics module 428 can display visual output to the user in a graphical user interface (GUI). The visual output may include text, graphics, video, and any combination thereof. Some or all of the visual output may correspond to user-interface objects. In some examples, one or more I/O devices 412 and/or 414 and/or controllers 432 and/or 434 (along with any associated modules and/or sets of instructions in medium 401) can detect and track gestures and/or eye movements, and can convert the detected gestures and/or eye movements into interaction with graphical objects, such as one or more user-interface objects. In examples in which the one or more eye I/O devices 412 and/or the eye I/O device controller 432 are configured to track a user's eye movements, the user can directly interact with graphical objects by looking at them.

Feedback may be provided, such as by the one or more eye I/O devices 412 or the one or more other I/O devices 414, based a state or states of what is being displayed and/or of the example system 400. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

The example system 400 can also include power system 444 for powering the various hardware components and may include a power management system, one or more power sources, a recharging system, a power failure detection circuit, a power converter or inverter, a power status indicator, and any other components typically associated with the generation, management and distribution of power in portable devices.

In some examples, the peripherals interface 416, the one or more processors 418, and the controller 420 may be implemented on a single chip, such as the processing system 404. In some other examples, they may be implemented on separate chips.

In some examples, a method is disclosed. The method may comprise: receiving, at a first time interval from a first sensor configured to output data indicative of a first position of an eye, first data; receiving, at a second time interval from a second sensor configured to output data indicative of a delta position of the eye, second data; determining, based on the first data, a first position of the eye; determining, based on the second data, a delta position of the eye; determining, using the first position of the eye and the delta position of the eye, a second position of the eye; and in response to determining the second position of the eye, generating an output signal indicative of the second position of the eye. Additionally or alternatively to one or more of the above examples, the first sensor may comprise an optical sensor. Additionally or alternatively to one or more of the above examples, the second sensor may comprise an electrooculography sensor. Additionally or alternatively to one or more of the above examples, the first time interval may be greater than the second time interval. Additionally or alternatively to one or more of the above examples, the first sensor may operate in a low-power mode during the first time interval. Additionally or alternatively to one or more of the above examples, the second sensor may operate in a low-power mode during the second time interval. Additionally or alternatively to one or more of the above examples, the method may further comprise determining, using the second position of the eye, a first eye movement behavior. Additionally or alternatively to one or more of the above examples, the first eye movement behavior may comprise saccadic movement, smooth pursuit, fixation, nystagmus, or vestibulo-ocular movement. Additionally or alternatively to one or more of the above examples, the method may further comprise: in response to determining the first eye movement behavior: determining a third time interval at which to receive data from the first sensor, and determining a fourth time interval at which to receive data from the second sensor. Additionally or alternatively to one or more of the above examples, determining the first eye movement behavior may comprise: generating a confidence score corresponding to a likelihood of the first eye movement behavior; comparing the confidence score to a threshold value; and determining that the confidence score exceeds the threshold value. Additionally or alternatively to one or more of the above examples, the method may further comprise receiving, from a third sensor, third data, and the first eye movement behavior may be determined using the third data. Additionally or alternatively to one or more of the above examples, the third sensor may comprise an accelerometer, a gyroscope, an electronic compass, a magnetometer, or an inertial measurement unit. Additionally or alternatively to one or more of the above examples, the third sensor may comprise a GPS sensor. Additionally or alternatively to one or more of the above examples, the third sensor may comprise an ambient light sensor. Additionally or alternatively to one or more of the above examples, the first eye movement behavior may be determined using a neural network. Additionally or alternatively to one or more of the above examples, the method may further comprise training a neural network using information comprising the first data, the second data, the third data, the second position of the eye, or the first eye movement behavior. Additionally or alternatively to one or more of the above examples, the method may further comprise determining a second eye movement behavior using the neural network. Additionally or alternatively to one or more of the above examples, the first sensor and the second sensor may be attached to a head-mounted device comprising a display. Additionally or alternatively to one or more of the above examples, the method may further comprise in response to determining the second position of the eye: determining a region of the display corresponding to the second position of the eye, the region having a display state equal to a first display state; and changing the display state of the region from the first display state to a second display state.

In some examples, a method is disclosed. The method may comprise: receiving, at a first time interval from a sensor associated with a user of an augmented reality system comprising a head-mounted display, first data, the first data indicative of a position of an eye of the user; determining, based on the first data and an attribute of the augmented reality system, an eye movement behavior associated with the eye; and in response to determining an eye movement behavior associated with the eye, determining a second time interval at which to receive data from the sensor. Additionally or alternatively to one or more of the above examples, determining the eye movement behavior may comprise: generating a confidence score corresponding to a likelihood of the eye movement behavior; comparing the confidence score to a threshold value; and determining that the confidence score exceeds the threshold value. Additionally or alternatively to one or more of the above examples, the augmented reality system may be configured to execute a software application and the attribute of the augmented reality system may indicate a state of the software application. Additionally or alternatively to one or more of the above examples, the sensor may operate in a low-power mode during the second time interval. Additionally or alternatively to one or more of the above examples, the eye movement behavior may comprise saccadic movement, smooth pursuit, fixation, nystagmus, or vestibulo-ocular movement. Additionally or alternatively to one or more of the above examples, the augmented reality system may comprise an accelerometer, a gyroscope, an electronic compass, a magnetometer, or an inertial measurement unit and the attribute of the augmented reality system comprises an output of the accelerometer, gyroscope, electric compass, magnetometer, or inertial measurement unit. Additionally or alternatively to one or more of the above examples, the augmented reality system may comprise a GPS sensor and the attribute of the augmented reality system may comprise an output of the GPS sensor. Additionally or alternatively to one or more of the above examples, the augmented reality system may comprise an ambient light sensor and the attribute of the augmented reality system may comprise an output of the ambient light sensor. Additionally or alternatively to one or more of the above examples, the eye movement behavior may be determined using a neural network. Additionally or alternatively to one or more of the above examples, the sensor may comprise an optical sensor. Additionally or alternatively to one or more of the above examples, the sensor may comprise an electrooculography sensor.

In some examples, a wearable computing system is disclosed. The wearable computing system may comprise: a frame configured to be worn about a head of a user; sensing circuitry comprising at least one electrode attached to the frame, the sensing circuitry configured to measure an electrical potential of an eye of the user; an optical sensor attached to the frame and configured to detect an image of the eye of the user according to an optical sensor parameter; and a processor operatively coupled to the sensing circuitry and the optical sensor, wherein the processor is configured to: obtain first data from the sensing circuitry, the first data indicating the electrical potential of the eye of the user; and adjust the optical sensor parameter based on the first data. Additionally or alternatively to one or more of the above examples, the optical sensor parameter may determine a rate at which the optical sensor detects images of the eye. Additionally or alternatively to one or more of the above examples, the optical sensor parameter may determine a power consumption mode of the optical sensor. Additionally or alternatively to one or more of the above examples, the processor may be further configured to selectively activate and deactivate the optical sensor based on the first data. Additionally or alternatively to one or more of the above examples, the processor may be further configured to determine a position of the eye based on an image detected by the optical sensor. Additionally or alternatively to one or more of the above examples, the processor may be further configured to detect movement of the eye based on the first data. Additionally or alternatively to one or more of the above examples, the processor may be further configured to adjust the optical sensor parameter based on the detected movement. Additionally or alternatively to one or more of the above examples, the processor may be further configured to determine whether the eye is engaged in an eye movement behavior of a plurality of predefined eye movement behaviors, the determination based at least on the first data. Additionally or alternatively to one or more of the above examples, the processor may be further configured to adjust the optical sensor parameter based on the determination. Additionally or alternatively to one or more of the above examples, the sensing circuitry may be configured to measure an electrical potential of an eye of the user according to a sensing circuitry parameter, and the processor may be further configured to adjust the sensing circuitry parameter based on an image of the eye output by the optical sensor. Additionally or alternatively to one or more of the above examples, the sensing circuitry parameter may determine a rate at which the sensing circuitry is to output data indicating the electrical potential of the eye to the processor. Additionally or alternatively to one or more of the above examples, the sensing circuitry may comprise two electrodes and at least one electrical component configured to measure an electrical potential difference between the two electrodes.

While this disclosure has been particularly shown and described with references to examples thereof, it will be understood by those skilled in the art that various changes in form and details may be made therein without departing from the scope of the disclosure.

What is claimed is:

1. A method comprising:
   receiving first data indicative of a first position of an eye, the first data received at a first rate from a first sensor;
   receiving second data indicative of a second position of the eye, the second data received at a second rate from a second sensor distinct from the first sensor, wherein the first sensor is configured to detect eye data at a first frequency, and wherein the second sensor is configured to detect eye data at a second frequency that is higher than the first frequency;
   determining, based on an optical sensor parameter, whether the first rate is to be increased with respect to the second rate;
   in accordance with a determination that the first rate is to be increased with respect to the second rate, adjusting a system parameter to increase the first rate with respect to the second rate; and
   in accordance with a determination that the first rate is to not be increased with respect to the second rate, forgoing adjusting the system parameter.

2. The method of claim 1, wherein the first sensor comprises an optical sensor.

3. The method of claim 1, wherein the second sensor comprises an electrooculography sensor.

4. The method of claim 1, wherein the first sensor operates in a low-power mode concurrently with the receiving of the first data at the first rate.

5. The method of claim 1, wherein the second sensor operates in a low-power mode concurrently with the receiving of the second data at the second rate.

6. The method of claim 1, further comprising:
determining, based on the first position of the eye and the second position of the eye, a third position of the eye; and
determining, based on the third position of the eye, a first eye movement behavior.

7. The method of claim 6, wherein the optical sensor parameter is based on the first eye movement behavior.

8. The method of claim 6, wherein determining the first eye movement behavior comprises:
generating a confidence score corresponding to a likelihood of the first eye movement behavior;
comparing the confidence score to a threshold value; and
determining that the confidence score exceeds the threshold value.

9. The method of claim 6, wherein:
the first sensor and the second sensor are associated with a head-mounted device comprising a display, and
the method further comprises in accordance with the determination of the third position of the eye:
determining a region of the display corresponding to the second position of the eye, the region having a display state equal to a first display state; and
changing the display state of the region from the first display state to a second display state.

10. The method of claim 1, further comprising:
receiving, from a third sensor, third data; and
determining, based on the third data, a first eye movement behavior.

11. The method of claim 1, wherein the optical sensor parameter is based on an output from a neural network.

12. The method of claim 1, further comprising training a neural network using information comprising the first data, the second data, or both.

13. The method of claim 1, wherein:
the second data is indicative of a delta position of the eye, and
the method further comprises determining whether the delta position of the eye is less than a threshold, wherein:
in accordance with a determination that the delta position is greater than the threshold, the optical sensor parameter indicates that the first rate is to be increased with respect to the second rate, and
in accordance with a determination that the delta position is not greater than the threshold, the optical sensor parameter indicates that the system parameter is not to be adjusted.

14. The method of claim 1, further comprising:
determining, based on the optical sensor parameter, whether the first rate is to be decreased with respect to the second rate;
in accordance with a determination that the first rate is to be decreased with respect to the second rate, adjusting the system parameter to decrease the first rate with respect to the second rate; and
in accordance with a determination that the first rate is not to be decreased with respect to the second rate, forgoing adjusting the system parameter.

15. The method of claim 14, wherein the determination that the first rate is to be decreased with respect to the second rate comprises a determination that the optical sensor parameter comprises an indication to reduce a power consumption of the first sensor.

16. The method of claim 14, wherein the determination that the first rate is to be increased with respect to the second rate comprises a determination that the optical sensor parameter comprises an indication to increase an accuracy of the first sensor.

17. The method of claim 1, further comprising:
determining, based on a second sensor parameter, whether the second rate is to be increased with respect to the first rate;
in accordance with a determination that the second rate is to be increased with respect to the first rate, adjusting a second system parameter to increase the second rate with respect to the first rate; and
in accordance with a determination that the second rate is not to be increased with respect to the first rate, forgoing adjusting the second system parameter.

18. A system comprising:
a first sensor configured to detect eye data at a first frequency;
a second sensor configured to detect eye data at a second frequency that is higher than the first frequency;
one or more processors operatively coupled to the first sensor and the second sensor, the one or more processors configured to perform a method comprising:
receiving first data indicative of a first position of an eye, the first data received at a first rate from a first sensor;
receiving second data indicative of a second position of the eye, the second data received at a second rate from a second sensor distinct from the first sensor;
determining, based on an optical sensor parameter, whether the first rate is to be increased with respect to the second rate;
in accordance with a determination that the first rate is to be increased with respect to the second rate, adjusting a system parameter to increase the first rate with respect to the second rate; and
in accordance with a determination that the first rate is to not be increased with respect to the second rate, forgoing adjusting the system parameter.

19. A non-transitory computer-readable medium storing instructions which, when executed by one or more processors, cause the one or more processors to perform a method, the method comprising:
receiving first data indicative of a first position of an eye, the first data received at a first rate from a first sensor;
receiving second data indicative of a second position of the eye, the second data received at a second rate from a second sensor distinct from the first sensor, wherein the first sensor is configured to detect eye data at a first frequency, and wherein the second sensor is configured to detect eye data at a second frequency that is higher than the first frequency;
determining, based on an optical sensor parameter, whether the first rate is to be increased with respect to the second rate;
in accordance with a determination that the first rate is to be increased with respect to the second rate, adjusting a system parameter to increase the first rate with respect to the second rate; and in accordance with a determination that the first rate is to not be increased with respect to the second rate, forgoing adjusting the system parameter.

* * * * *